United States Patent [19]
Suzuki et al.

[11] Patent Number: 5,253,136
[45] Date of Patent: Oct. 12, 1993

[54] TAPE CASSETTE HAVING AN INFORMATION INDICATING PORTION FOR INDICATING INFORMATION RELATING TO PREDETERMINED CHARACTERISTICS OF THE TAPE CASSETTE

[75] Inventors: Kazuyoshi Suzuki; Hiroshi Fujii, both of Tokyo, Japan

[73] Assignee: Sony Corporation, Tokyo, Japan

[21] Appl. No.: 748,520

[22] Filed: Aug. 22, 1991

[30] Foreign Application Priority Data

Aug. 30, 1990 [JP] Japan .................................. 2-26467

[51] Int. Cl.⁵ .......................................... G71B 23/02
[52] U.S. Cl. .................................................. 360/132
[58] Field of Search ........................................ 360/132

[56] References Cited

U.S. PATENT DOCUMENTS

| | | | |
|---|---|---|---|
| 4,933,796 | 6/1990 | Tanaka | 360/132 |
| 4,942,488 | 7/1990 | Osawa | 360/132 X |
| 5,016,123 | 5/1991 | Karsh | 360/132 X |
| 5,075,811 | 12/1991 | Goto | 360/132 |
| 5,143,317 | 9/1992 | Sugiyama | 360/132 X |

FOREIGN PATENT DOCUMENTS

| | | |
|---|---|---|
| 0153645 | 1/1982 | Fed. Rep. of Germany . |
| 3340942 | 5/1984 | Fed. Rep. of Germany . |
| 3517584 | 11/1986 | Fed. Rep. of Germany . |
| 3639818 | 5/1988 | Fed. Rep. of Germany . |
| 3213621 | 12/1992 | Fed. Rep. of Germany . |
| 2096572 | 4/1982 | United Kingdom . |
| 2131000 | 11/1983 | United Kingdom . |
| 2185142 | 1/1986 | United Kingdom . |

*Primary Examiner*—John H. Wolff
*Attorney, Agent, or Firm*—William S. Frommer; Alvin Sinderbrand

[57] ABSTRACT

A tape cassette for use in a tape player includes a cassette case having a main portion with an external size which is substantially the same as that of the case of a different type of tape cassette and an additional portion which extends from one side of the main portion and has a thickness slightly smaller than that of the main portion. An information indicating portion is provided at a lower surface of the additional portion for indicating respective information by whether or not a hole is present at a predetermined position. An information reading member provided in the tape player for determining whether or not a hole is present at each respective predetermined position in the information indicating portion can be located at a position so as not to interfere with the cassette case of the different type of tape cassette. As a result, the information reading member will not hinder the loading operation of the different type of tape cassette into the tape player and the information reading member will not malfunction due to the loading of the different type of tape cassette.

10 Claims, 13 Drawing Sheets

TAPE CASSETTE HAVING AN INFORMATION INDICATING PORTION FOR INDICATING INFORMATION RELATING TO PREDETERMINED CHARACTERISTICS OF THE TAPE CASSETTE

BACKGROUND OF THE INVENTION

1. Field of the Invention

The present invention relates to a tape cassette, and more particularly is directed to a tape having a cassette case with a portion thereof indicating information concerning the type of the tape cassette.

2. Description of the Prior Art

In a known tape player capable of accepting two kinds of tape cassettes for recording two different kinds of signals in accordance with respective signal transmitting systems, problems may arise. One problem is that an information reading member provided in the tape player for reading information indicated on one type of the tape cassettes may hinder a loading operation of the other type of tape cassette into the tape player or may malfunction due to the loading of the other type of tape cassette.

The above problem will be further explained with reference to a tape player capable of accepting both a tape cassette for recording a signal of the NTSC system and a tape cassette for recording a signal of the high definition television (HD) system (the latter will be hereinafter referred to as "HD tape cassette").

At the present time, a tape cassette for recording a signal of the NTSC system may be a VHS tape cassette, a beta tape cassette, an 8-mm tape cassette, or a VHS C tape cassette. In the following discussion only the VHS tape cassette will be considered. However, the problem is not so limited and may apply to any of the tape cassettes for recording a NTSC signal.

As shown in FIGS. 10–12, a VHS tape cassette 1 includes a cassette case 2 which, as a means for indicating predetermined information relating to the tape cassette 1, may have predetermined position at which a hole is, or is not present.

The cassette case 2 of the known tape cassette 1 contains various members including tape reels and, as a result, little free room exists within the cassette case. Therefore, the above-mentioned information indicating hole cannot be formed at a position at which the tape reels or other members are located within the cassette case 2. In other words, the position at which the hole may be formed is limited.

As shown in FIG. 12, two rear corner portions 4 of a lower surface of the cassette case 2 are regions which do not correspond with the various members contained within the cassette case.

Similarly, two rear corner portions of a lower surface of a cassette case of an HD tape cassette, which is similar in external form to the VHS tape cassette 1, are defined as information indicating portions. These indicating portions are shown, for convenience, in FIG. 12 as a plurality of two-dot chain line circles 3 formed at locations on the lower surface of the cassette case 2 of the VHS tape cassette 1 corresponding to the locations that such indicating portions would occupy on the case of an HD tape cassette. In this case, when the VHS tape cassette 1 is loaded into a cassette holder of the tape player, all detection switches for detecting the presence or absence of the holes of the HD tape cassette are undesirably depressed by the lower surface of the cassette case 2.

Further, the two corner portions 4 of the VHS tape cassette 1 are not specified as special areas according to the EIAJ Standard, and thus these portions 4 are normally formed with knurls or surface projections 5, as shown in FIG. 11, for preventing slippage. Accordingly, an upper end of a pin 7 of a detection switch 6 provided in the tape player may abut against a slant surface 5a of the projection 5 as shown in FIG. 13 or, instead, may engage between the adjacent projections 5, thereby possibly causing the detection switch 6 not to operate precisely or to break in response to repeated operations over the long-term. In an attempt to solve this problem, a pin 7' having a sufficiently large upper end may be provided, as shown in FIG. 14. However, in this situation, as is to be appreciated, it is necessary to enlarge the intervals between the detection switches 6, which may result in other problems, for example, it may not be possible to indicate a relatively large quantity of information in a limited region.

Further, in the case of using a non-contact type information reading member, such as a reflection type photosensor, rather than the contact type detection switch 6 mentioned above, a stable reflected light quantity cannot be obtained due to the surface projections 5 of the VHS tape cassette 1, so that malfunctions or misreading of the indicated information may result.

OBJECTS AND SUMMARY OF THE INVENTION

Accordingly, it is an object of the present invention to provide a tape cassette which avoids the above-mentioned disadvantages of the prior art.

More specifically, it is an object of the present invention to provide a tape cassette which ensures that an information reading member provided in a tape player for reading information relating to that tape cassette will not interfere with loading into the tape-player of a different type of tape cassette having an external size slightly smaller than that of the tape cassette according to the present invention, and which further avoids malfunctions of the information reading member upon loading the different type of tape cassette into the tape player.

According to an aspect of the present invention, a tape cassette comprises a cassette case for accommodating a magnetic recording tape, the cassette case having a main portion of an external size which is substantially the same as that of a cassette case of a different type of tape cassette and an additional portion which extends from one side of the main portion and has a thickness slightly smaller than that of the main portion; and an information indicating portion provided at a lower surface of the additional portion for indicating information relating to the respective tape cassette.

With this arrangement, an information reading member provided in a tape player for determining whether or not a hole is present at a predetermined position in the information indicating portion can be located at a position so as not to interfere with the cassette case of the different type of tape cassette. Therefore, the information reading member will not hinder the loading of the different type of tape cassette into the tape player and the information reading member will not malfunction due to the loading of the different type of tape cassette.

The above, and other objects, features and advantages of the present invention, will be more fully understood from the following detailed description of preferred embodiments of the present invention when read in conjunction with the accompanying drawings in which corresponding parts are identified by the same reference numerals.

DETAILED DESCRIPTION OF THE PREFERRED EMBODIMENTS

A tape cassette 8 according to an embodiment of the present invention will now be described in detail with reference to FIGS. 1 and 2 of the accompanying drawings.

As shown, the tape cassette 8 is an HD tape cassette which includes a cassette housing or cassette case 9.

The cassette case 9 is constructed of an upper half 10 and a lower half 11 connected together to have a relatively thin rectangular box-like configuration.

Figure 11:
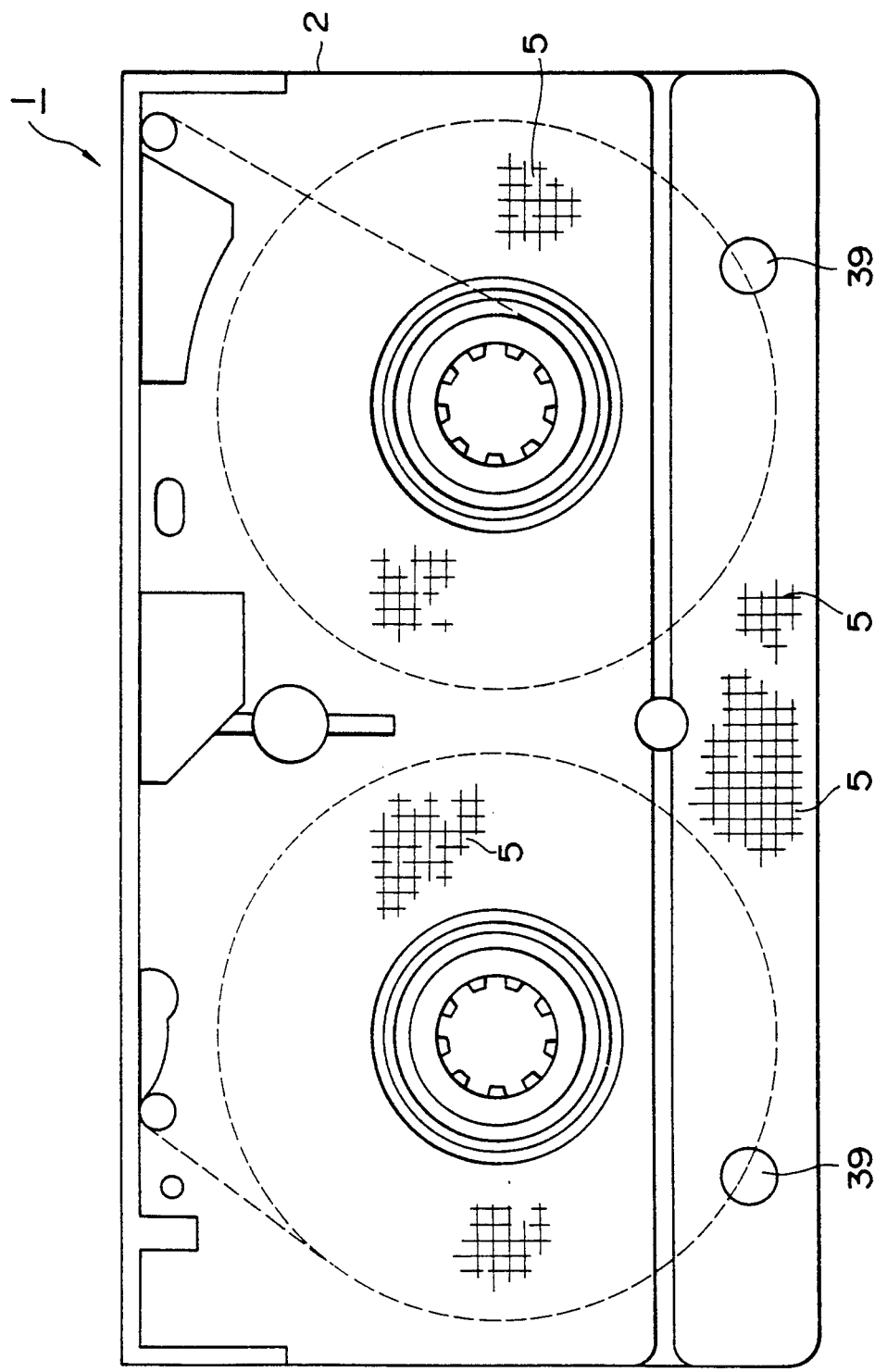
FIG. 11 is a bottom view of the type of tape cassette shown in FIG. 10.

The cassette case 9 includes a main portion 12 having almost the same external form, especially with respect to the dimensions (length, width and thickness), as that of the cassette case 2 of the VHS tape cassette 1, shown in FIG. 11. An additional portion 13 projects from a right side of the main portion 12 as viewed in FIG. 2. (In the following description, the terms "right", "left", "front" and "rear" will be used respectively in accordance with the right, left, front and rear directions as viewed in FIG. 2). The additional portion 13 has a dimension in the front and rear direction substantially equal to that of the main portion 12, a relatively small width measured in the right and left direction, for example, about 3% of that of the main portion 12, and a thickness slightly smaller than that of the main portion 12, for example, about 90% or less of that of the main portion 12, as is apparent on FIG. 8. An upper surface of the additional portion 13 is flush with an upper surface of the main portion 12. Accordingly, a lower surface 13a of the additional portion 13 is slightly higher than, or stepped upwardly relative to a lower surface 12a of the main portion 12. Thus, a relatively shallow elongated recess extends between the front and rear ends of the right edge portion of the lower surface of the cassette case 9.

The internal space of the main portion 12 communicates with that of the additional portion 13.

The cassette case 9 has, at its front, a tape drawing or opening recess 14 elongated in the right and left directions. Upon loading of the tape cassette 8 into a tape player, a member (not shown) for drawing a magnetic tape 20 out of the cassette case 9 and a capstan (not shown) are inserted into the tape drawing recess 14.

The right-hand portion of the tape drawing recess 14 is elongated somewhat more than the left-hand portion thereof due to the following reason. When the cassette case 9 of the HD tape cassette 8 and the cassette case 2 of the VHS tape cassette 1 are superimposed upon each other with the left side surface of the cassette case 9 positioned so as to be flush with the left side surface of the cassette case 2, as on FIG. 12, a plurality of independent recesses 14' of the cassette case 2 should be included in the tape drawing recess 14 of the cassette case 9.

Portions of the front surface of the cassette case 9 at the right and left sides of the tape drawing recess 14, may be opened to form tape outlets 15 and 16. A pair of tape guides 17 are vertically arranged in the tape outlets 15 and 16 at the inner ends of the sides of the tape drawing recess 14.

A pair of tape reels 18 and 19 are rotatably accommodated in the cassette case 9, and opposite end portions of the magnetic tape 20 are wrapped around the tape reels 18 and 19. The magnetic tape 20 may be partially led out of the cassette case 9 through the tape outlets 15 and 16. In an unloaded condition of the tape cassette 8, the lead-out portion of the magnetic tape 20, which is outside the cassette case 9, is made taut and is guided at its opposite ends by the two tape guides 17 in front of the tape drawing recess 14.

Figure 12:
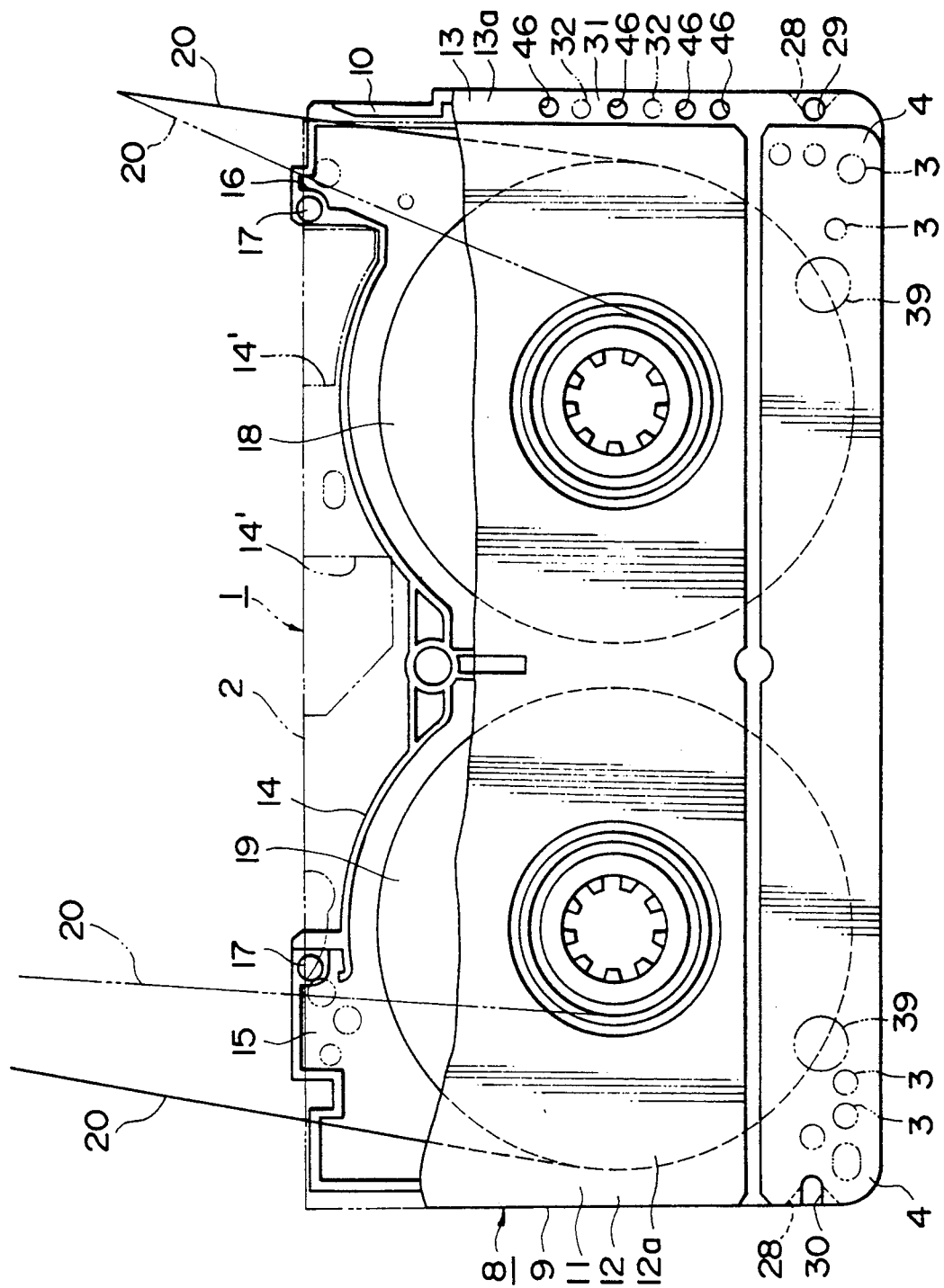
FIG. 12 is a partially cut-away bottom plan view illustrating a superimposed condition of the tape cassette according to the embodiment of the present invention shown in FIG. 1, and the different type of tape cassette shown on FIG. 11.
Figure 13:
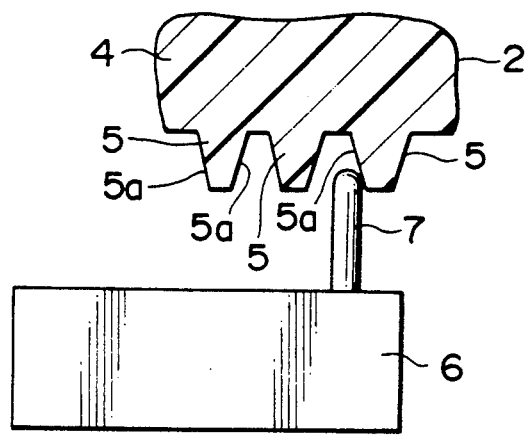
FIG. 13 is an enlarged fragmentary sectional view of the type of tape cassette shown on FIG. 11 and to which reference will be made in explaining a problem associated with that type of tape cassette.
Figure 14:
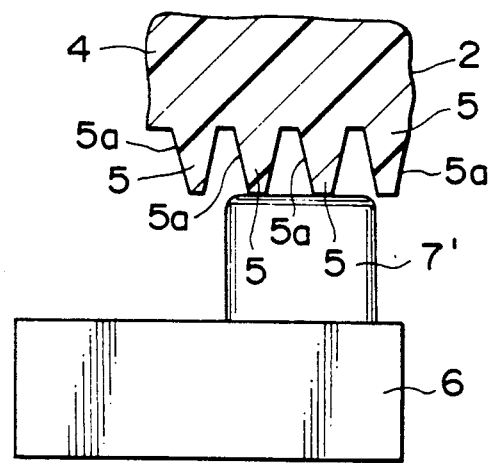
FIG. 14 is a view similar to FIG. 13 and to which reference will be made in explaining another problem associated with the type of tape cassette shown in FIG. 11.

As mentioned above, the right portion of the tape drawing recess 14 is elongated more than the left portion thereof. Accordingly, the open area of the right tape outlet 16 is smaller than that of the left tape outlet 15. However, since the additional portion 13 is formed on the right side of the cassette case 9, the open area of the right tape outlet 16 can be somewhat extended into the portion 13 and thereby enlarged. With this configuration, as shown in FIG. 12, upon loading the tape cassette 8, the magnetic tape 20 can be drawn out of the cassette case 9 without contacting the tape guides 17 and the cassette case 9. By way of clarification, in FIG.

12, a solid line indicates the path of the magnetic tape 20 when the roll diameter of the magnetic tape 20 wrapped around the tape reel 18 or 19 is at a maximum, while a two-dot chain line indicates the path of the magnetic tape 20 when the roll diameter on reel 18 or 19 is a minimum.

As shown in FIGS. 1-6, an outer lid 21 is provided to selectively open and close the front of the cassette case 9 at which the magnetic tape 20 may be withdrawn. The lid 21 is integrally formed with a cover portion 22 having a substantially inverted L-shaped vertical cross-section (FIGS. 6A and 6B) and with a pair of side portions 23 which project rearwardly from the right and left ends of the cover portion 22. The side portions 23 of the lid 21 are rotatably mounted, as at 23a, near their rear ends on the front end portions of the right and left side surfaces of the cassette case 9. Accordingly, the lid 21 can be moved between a closed position, as shown in FIG. 6A, in which a run of the magnetic tape 20 is stretched across the front surface of the cassette case 9 and lies immediately in back of the cover portion 22, and an open position, as shown in FIG. 6B, in which the cover portion 22 is moved upwardly so as to expose the front surface of the cassette case 9.

Figure 5:
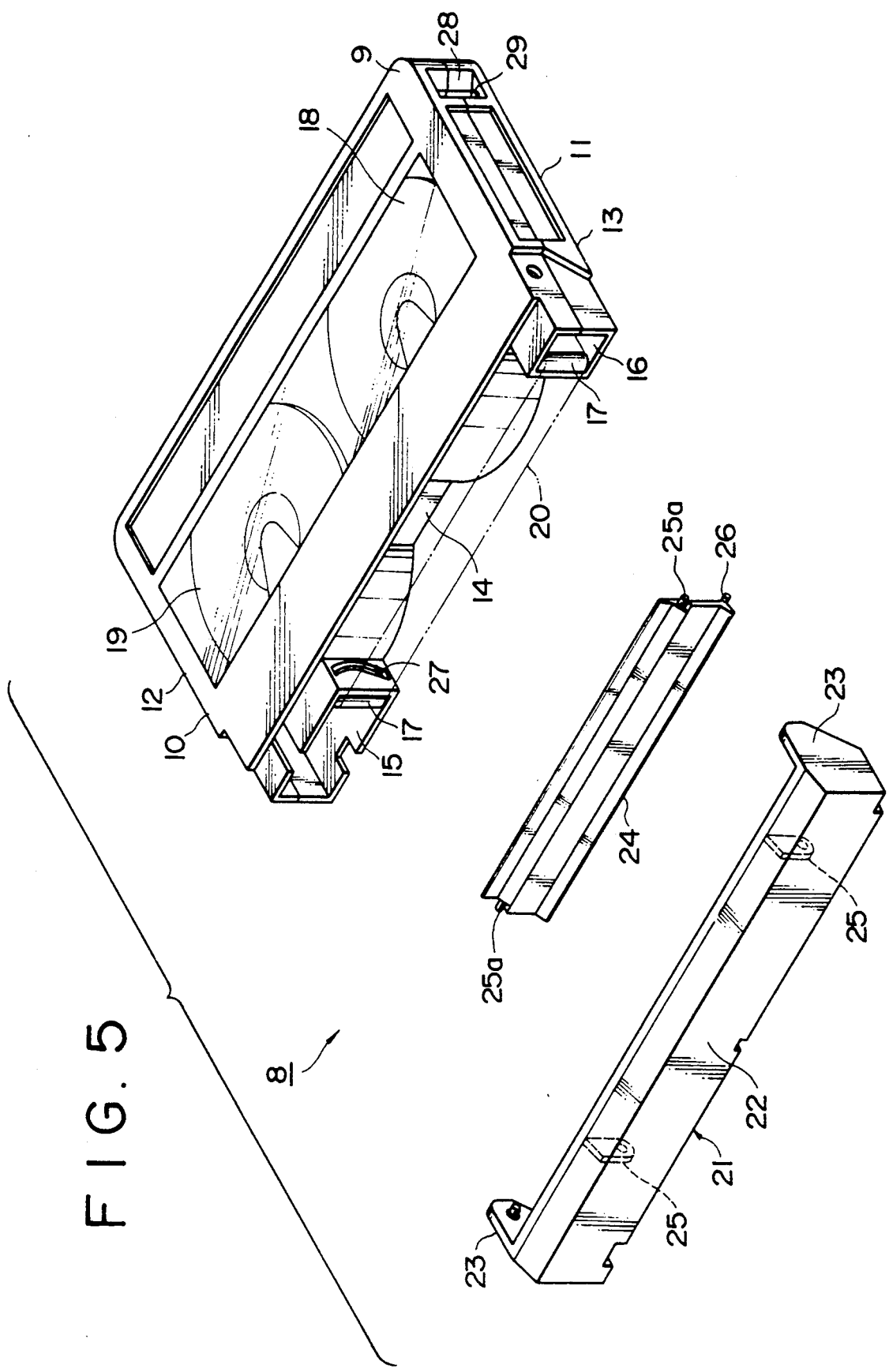
FIG. 5 is an exploded perspective view of the tape cassette shown in FIG. 1.
Figure 6A:
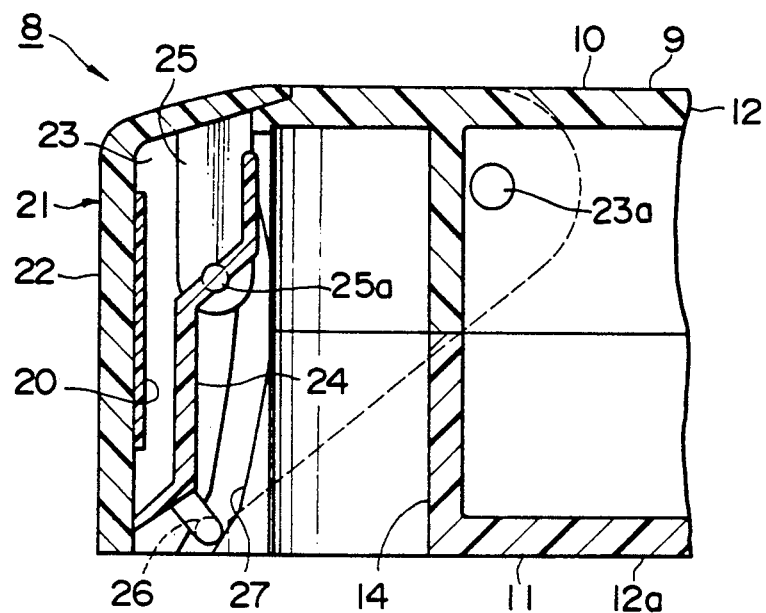
FIG. 6A is an enlarged cross-sectional view taken along the line VI—VI in FIG. 2, showing the front lid in a closed condition.
Figure 6B:
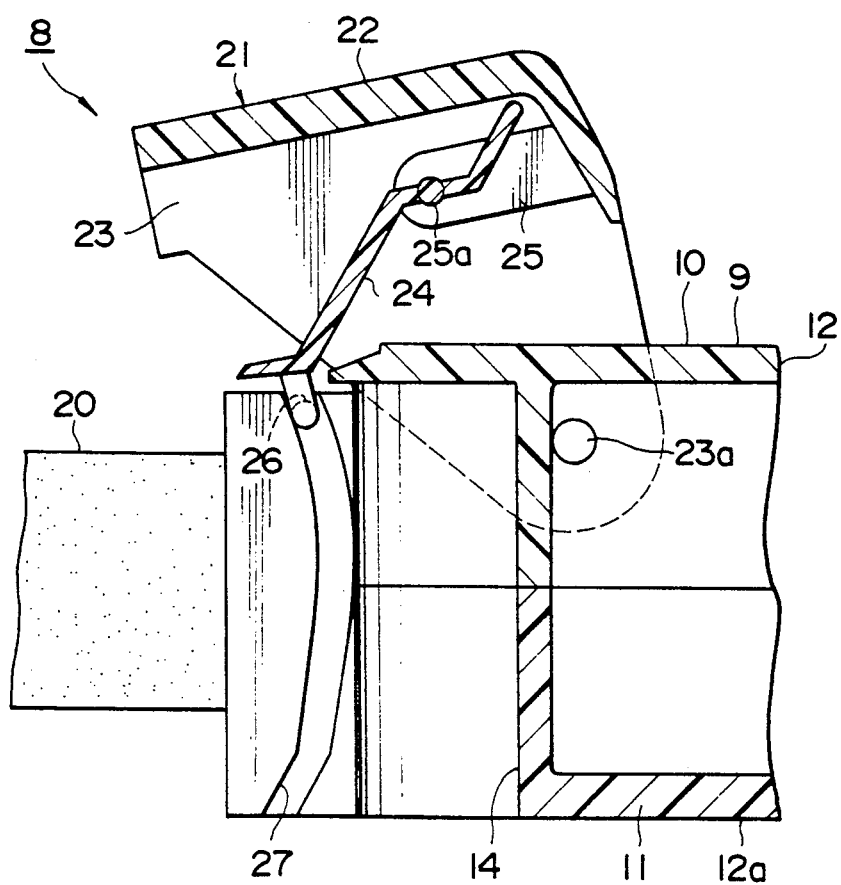
FIG. 6B is a cross-sectional view similar to that of FIG. 6A, but showing the front lid in an open condition.

As shown in FIGS. 5, 6A and 6B, the tape cassette 8 is further provided with an inner lid 24 having a relatively thin plate-like shape with a length slightly smaller than the length of the recess 14 of the cassette case 9.

The inner lid 24 is rotatably supported by pins 25a at the upper ends of its opposite sides engaging in a pair of supporting portions or hangers 25 extending from the cover portion 22 of the outer lid 21. Further, pins 26 extend from the lower ends of the opposite sides of the lid 24 and are slidably engaged in respective guide grooves 27 formed in the confronting side wall surfaces of the recess 14.

When the outer lid 21 is in its closed position, the inner lid 24 is also in a closed position so as to cover a back surface of the magnetic tape 20, as shown in FIG. 6A. On the other hand, when the outer lid 21 is in its open position, the inner lid 24 is displaced thereby to an open position so as to be located above the front end portion of the cassette case 9, as shown in FIG. 6B. During the movement of the inner lid 24 between its closed and opened positions, the attitude of the lid 24 is controlled by the outer lid 21 through the supporting portions 25 and the movement of the pins 26 along the guide grooves 27.

As shown in FIGS. 1-5 and 12, gripping recesses 28 are formed near the rear ends of the right and left side surfaces of the cassette case 9. Each gripping recess 28 is elongated in the vertical direction (FIGS. 3 and 4) and is formed to resemble a V-shaped groove. Upper and lower ends of each gripping recess 28 terminate just before the respective upper and lower surfaces of the cassette case 9. Each gripping recess 28 is provided to engage a retaining member of, for example, an autochanger mechanism. The depth of each gripping recess 28 is equal to or slightly smaller than the width of the additional portion 13 of the cassette case 9 in the right and left direction.

As shown in FIGS. 1-3, 5 and 12, a circular reference hole 29 passes through a bottom wall of the additional portion 13 of the cassette case 9 and opens into the right gripping recess 28. Accordingly, the reference hole 29 is associated with the right gripping recess 28.

As shown in FIGS. 1, 2, 4 and 12, a directional positioning hole 30 passes through a bottom wall of the main portion 12 of the cassette case 9 at a position corresponding to the left gripping recess 28. The directional positioning hole 30 is formed as a cutout elongated laterally in the right and left direction such that a left end of the cutout is flush with the left side surface of the cassette case 9. Accordingly, the directional positioning hole 30 is associated with the left gripping recess 28.

Figure 1:
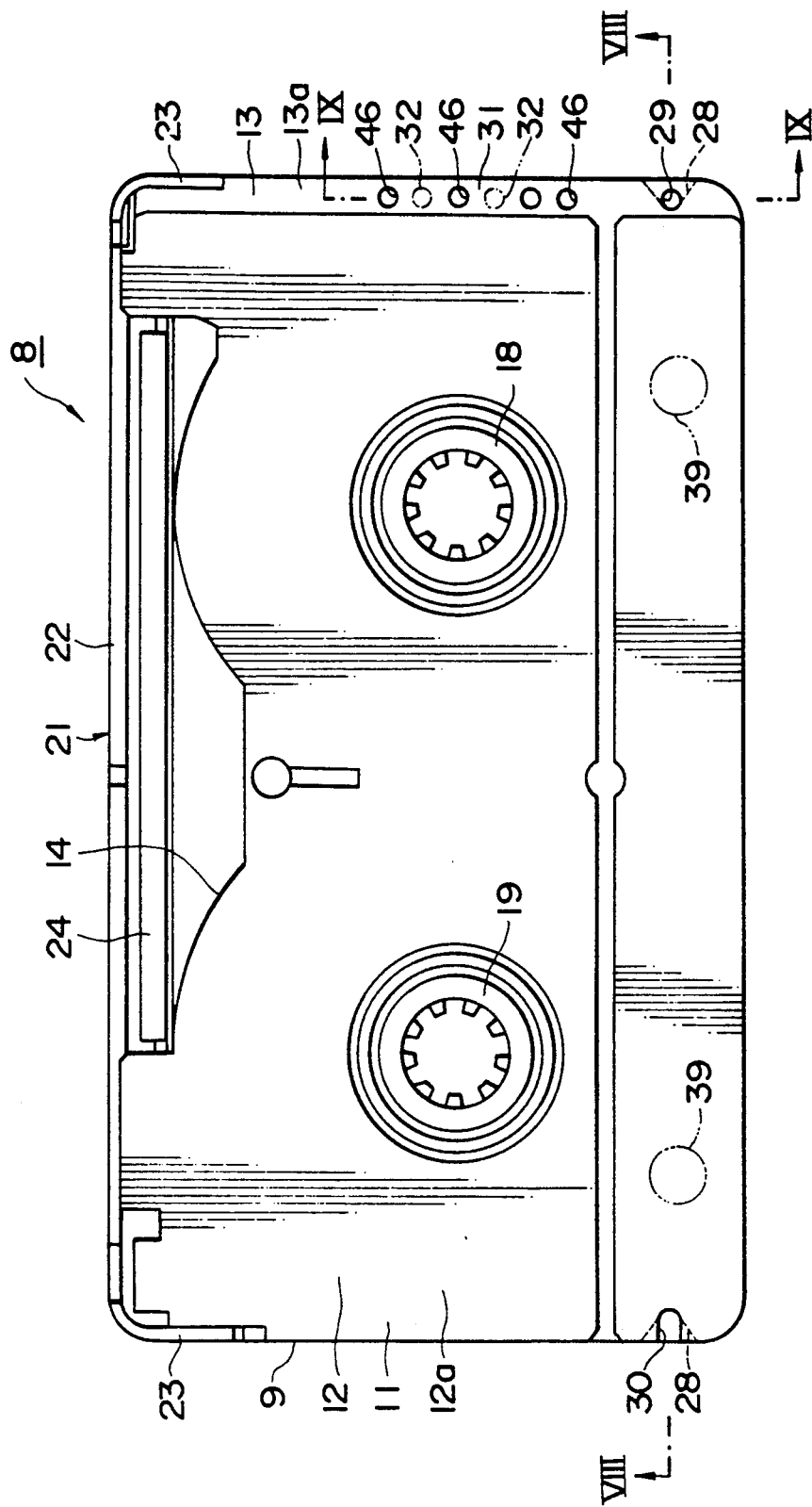
FIG. 1 is a bottom plan view of a tape cassette according to an embodiment of the present invention.
Figure 2:
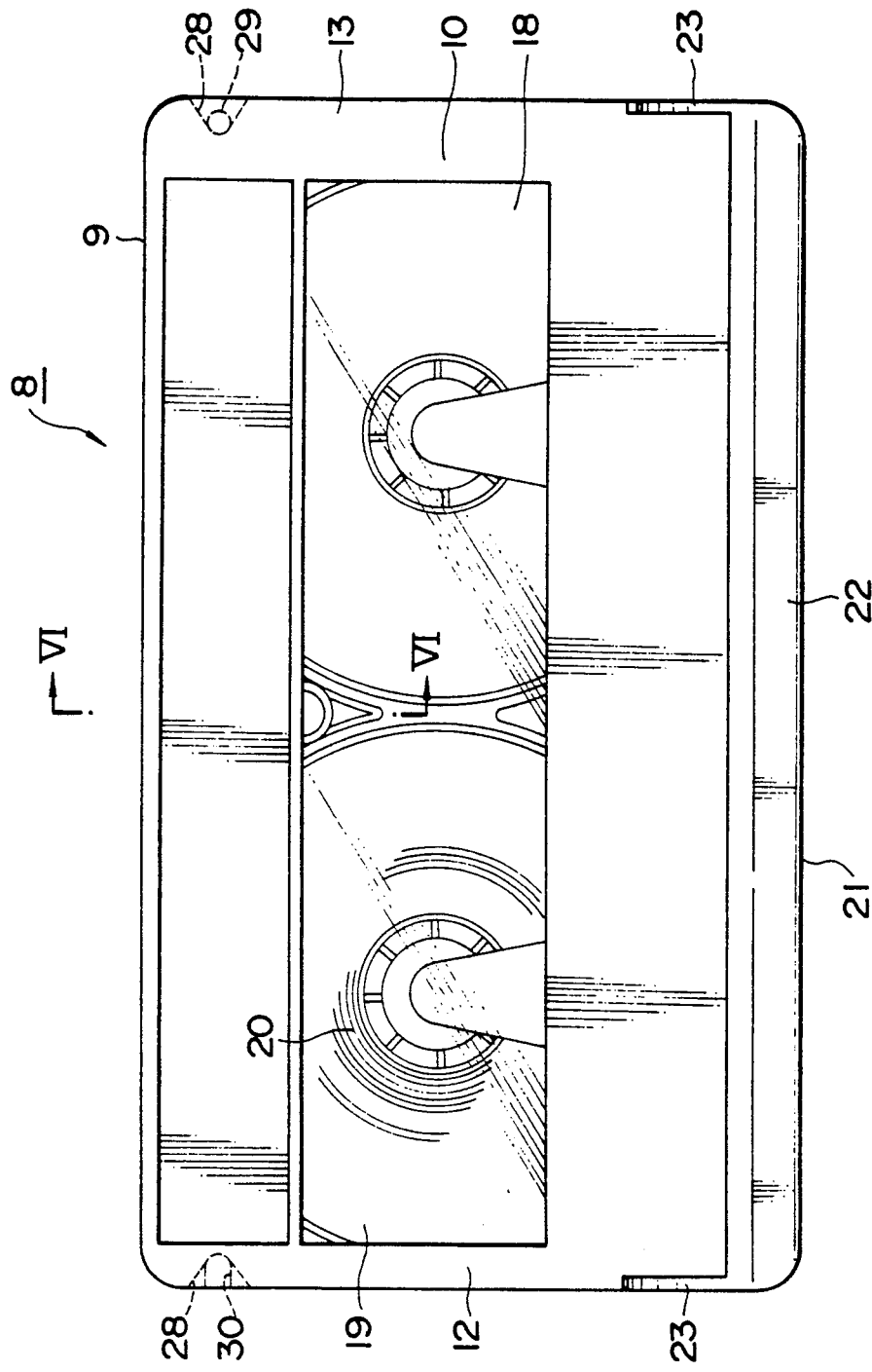
FIG. 2 is a top plan view of the tape cassette shown in FIG. 1.
Figure 3:
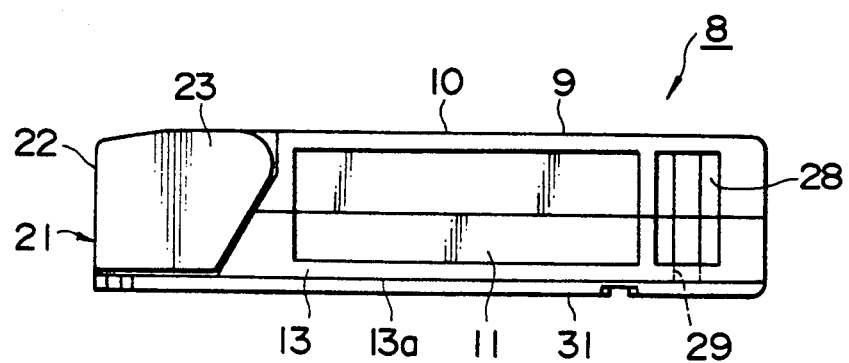
FIG. 3 is a right side elevational view of the tape cassette of FIG. 2.
Figure 4:
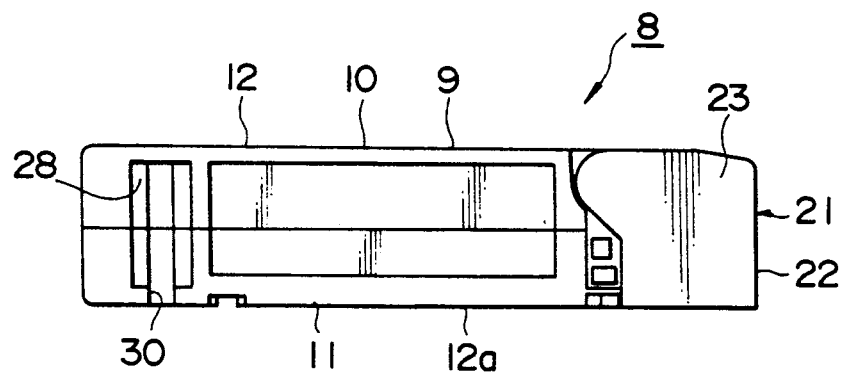
FIG. 4 is a left side elevational view of the tape cassette of FIG. 2.

As shown in FIGS. 1 and 12, an information indicating portion 31 is formed on the bottom wall of the additional portion 13 of the cassette case 9 at an intermediate portion between the front and rear end portions of the bottom wall. Upon loading a tape cassette into a tape player, the tape player recognizes, for example, whether the loaded tape cassette is a VHS tape cassette or an HD tape cassette, the magnetic characteristics of the tape, that is, a difference in the magnetic particle material or a difference in the method of forming the tape such as by coating or depositing magnetic particles, the length of the tape, the thickness of the tape, the diameters of the tape reels around which the tape is wrapped, whether or not the frequency band of a signal for recording on the tape is relatively wide, whether or not the tape is a soft tape having a previously recorded signal, whether or not a signal is re-recordable on the tape, and so forth, according to the presence or absence of holes at circular portions 32 in the information indicating portion 31.

Figure 7:
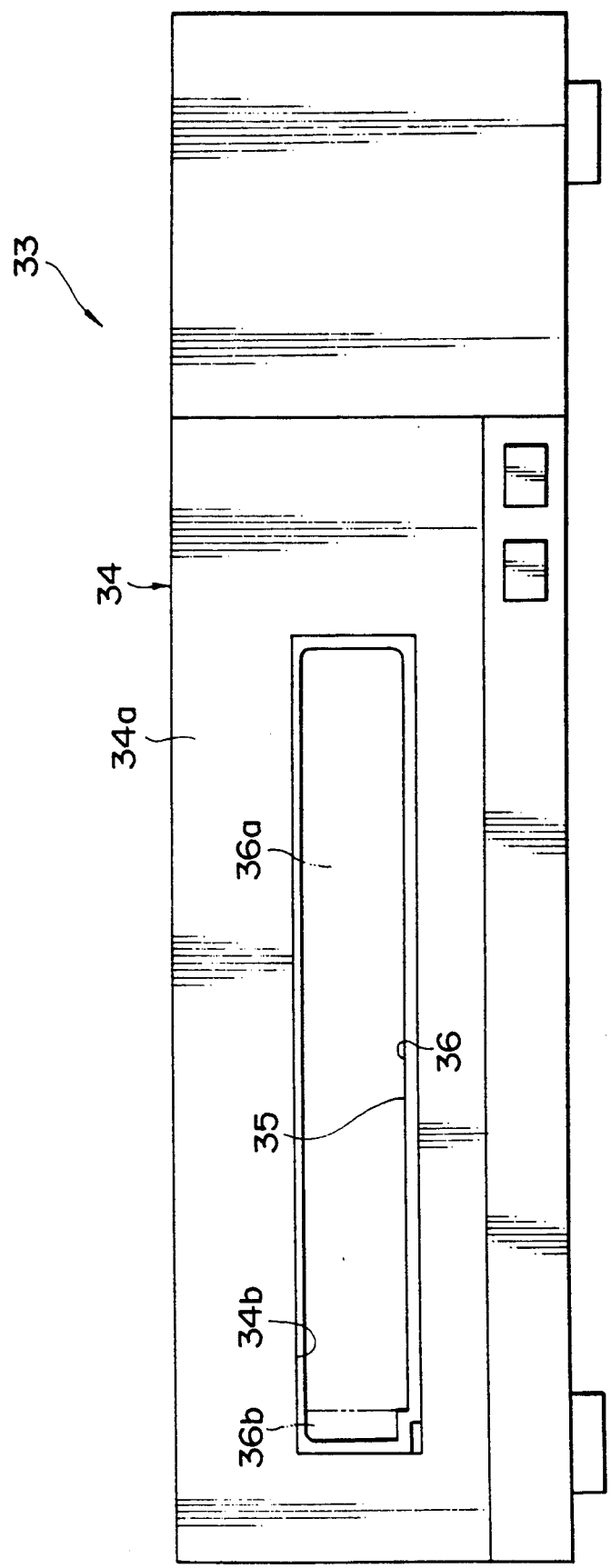
FIG. 7 is a front elevational view of a tape player to which the present invention may be applied.

A tape player 33, will now be briefly described with reference to FIG. 7, and, by way of example, such player 33 is adapted to employ either the HD tape cassette 8 or the VHS tape cassette 1. More particularly, a housing 34 of the tape player 33 is shown to have a front panel 34a formed with a cassette insertion opening 34b having a horizontally elongated rectangular shape. The tape cassette 1 or 8 may be loaded into and unloaded from the tape player 33 through the cassette insertion opening 34b.

A cassette holder 35 receives the tape cassette 1 or 8 which is inserted through the cassette insertion opening 34b for holding the tape cassette 1 or 8 in a predetermined loading position.

The cassette holder 35 is formed with a cassette receiving hole 36 having a shape which corresponds to the elevational shape of the cassette case 9 of the HD tape cassette 8. More specifically, the cassette receiving hole 36 includes a major hole portion 36a having a shape which accommodates the main portion 12 of the cassette case 9 and an additional hole portion 36b having a shape which accommodates the additional portion 13 of the cassette case 9. The additional hole portion 36b is formed as a continuation of the major hole portion 36a at one side of the latter. The upper edge of the major hole portion 36a is flush with the upper edge of the additional hole portion 36b. Therefore, the lower edge of the additional hole portion 36b is at a level slightly higher than that of a lower edge of the major hole portion 36a.

In loading a VHS tape cassette 1 into the tape player 33, the VHS tape cassette 1 can be passed only through the major hole portion 36a of the cassette receiving hole 36 of the cassette holder 35 since the vertical width of the additional hole portion 36b of the cassette receiving hole 36 is smaller than the thickness of the cassette case 2 of the VHS tape cassette 1.

In loading an HD tape cassette 8 into the tape player 33, the HD tape cassette 8 is passed through both the major hole portion 36a and the additional hole portion 36b of the cassette receiving hole 36 of the cassette holder 35, that is, the cassette case 9 fills substantially the entire area of the cassette receiving hole 36.

As is conventional, the cassette holder 35 is suitably movable between an elevated cassette receiving and ejecting position, in which its opening 36 generally registers with the opening 34b of the front housing panel 34a, and a relatively depressed loaded position in which a tape cassette 1 or 8 situated in the holder 35 is operatively positioned within the player 33.

Figure 8:
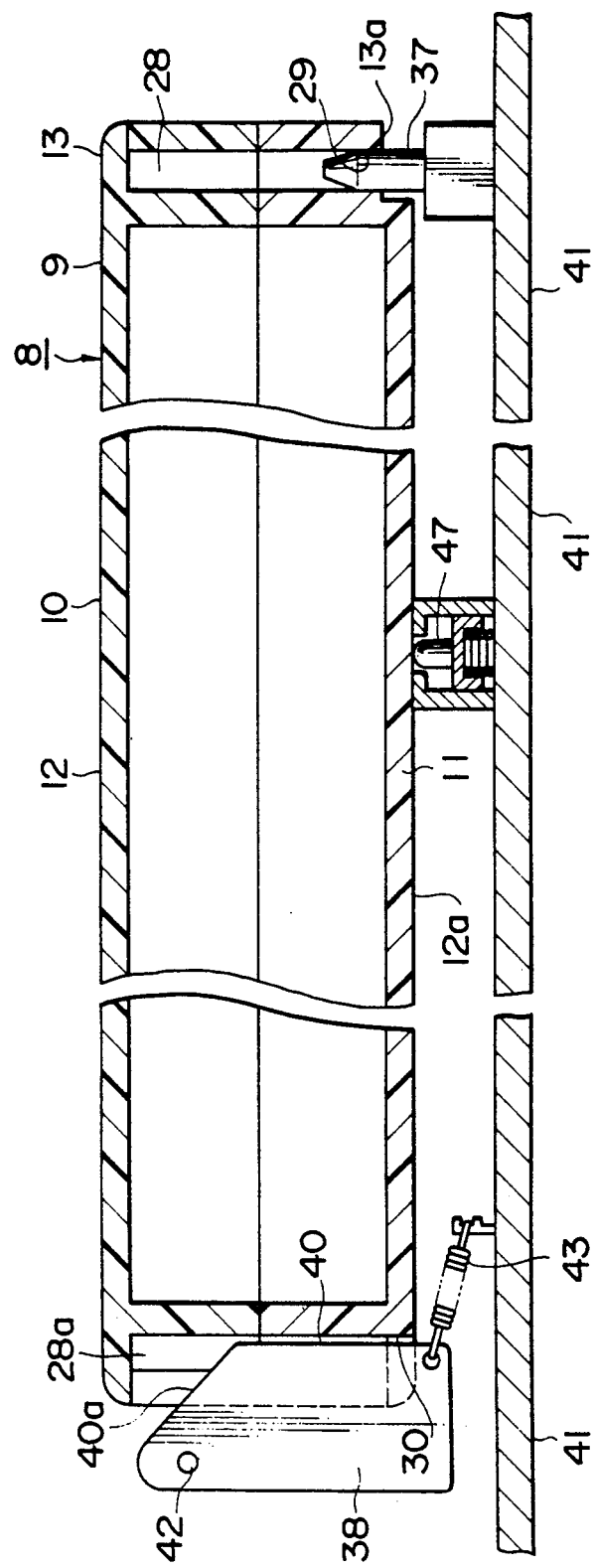
FIG. 8 is an enlarged cross-sectional view taken along the line VIII—VIII in FIG. 1 with the tape cassette loaded in place.
Figure 9:
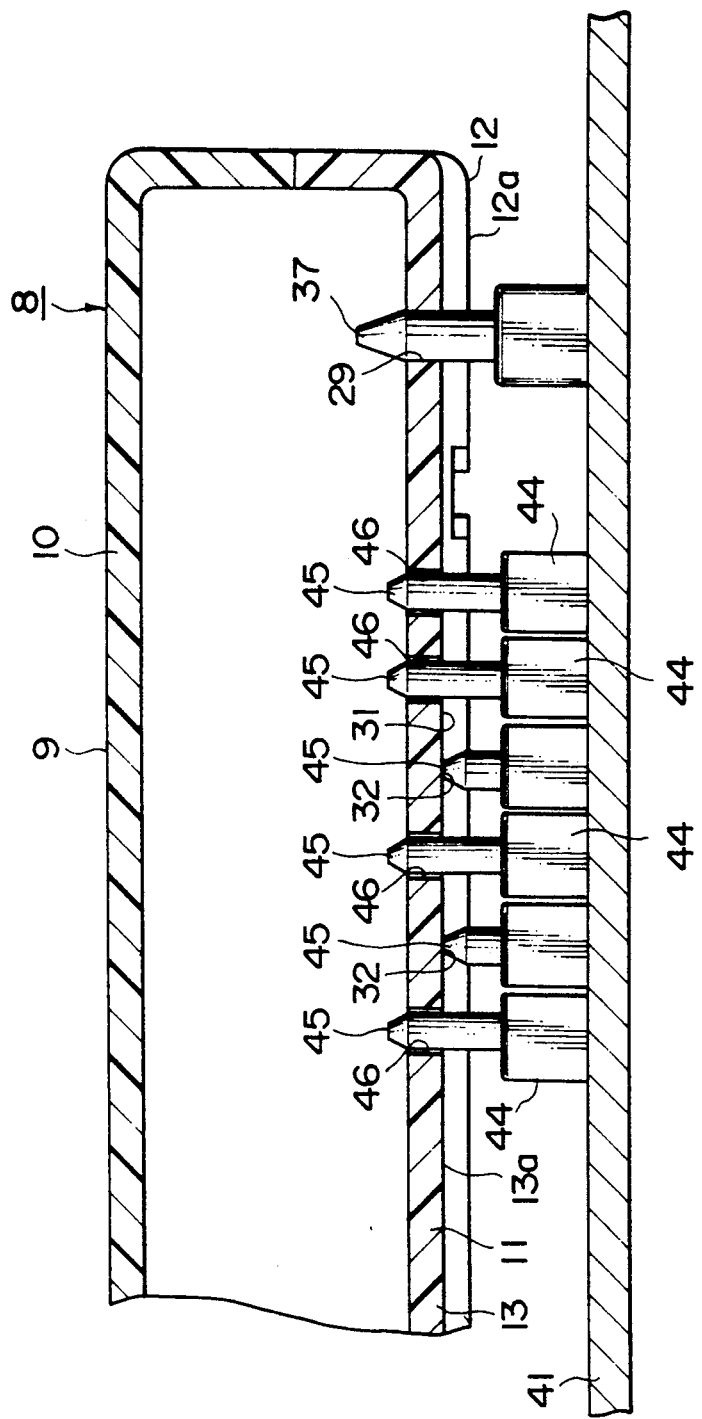
FIG. 9 is an enlarged fragmentary sectional view taken along the line IX—IX in FIG. 1 with the tape cassette loaded in place.
Figure 15:
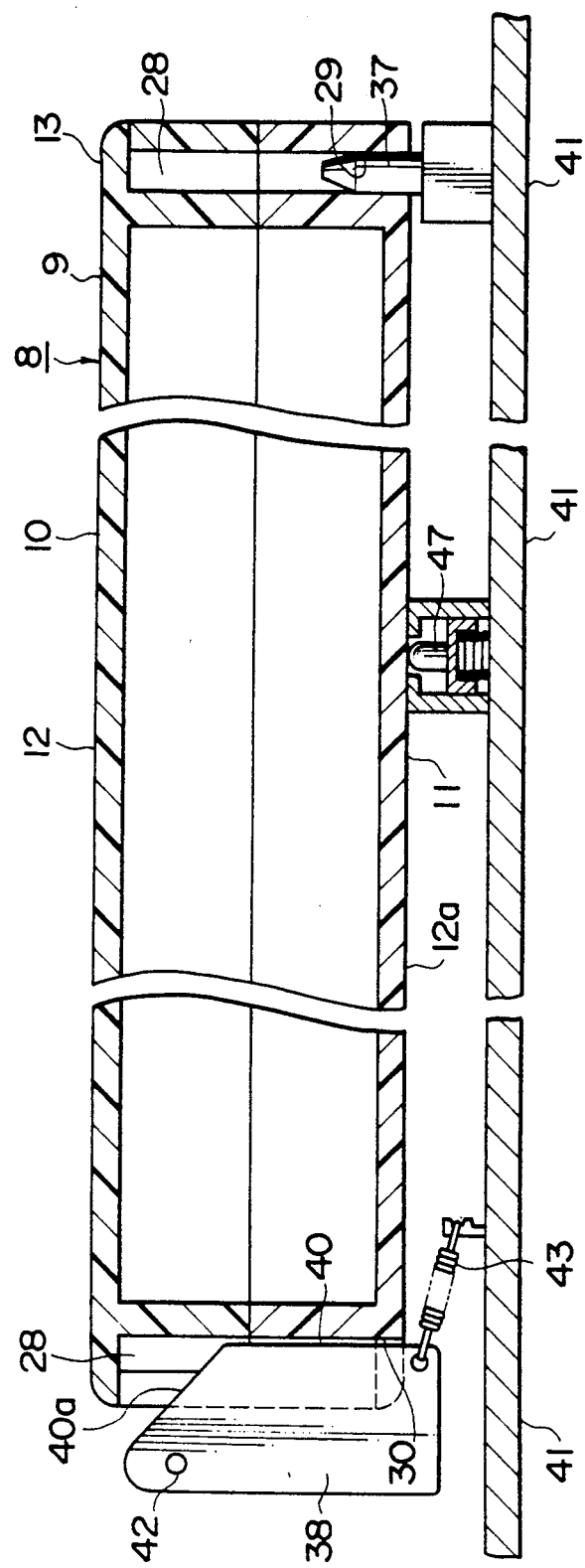
FIG. 15 is a view similar to FIG. 8, but showing a tape cassette according to another embodiment of the present invention.

As shown in FIGS. 8, 9 and 15, when the HD tape cassette 8 is moved downwardly with the holder 35 to its operative position in the tape player 33, a reference pin 37 is inserted into the reference hole 29 formed through the lower wall of the additional portion 13 of the cassette case 9, thereby positioning the cassette case 9 with respect to both the front and rear directions and the right and left directions. Furthermore, a directional positioning member 38 is inserted laterally into the directional positioning hole 30 formed through the lower wall of the left portion of the cassette case 9, thereby holding the cassette case 9 against rotation about the reference pin 37. Thus, as a result of the insertion of the reference pin 37 and the directional positioning member 38, the cassette case 9 is accurately positioned in the horizontal directions. Moreover, the upper end surfaces of two height limiting pins (not shown) come into contact with respective right and left positions 39 at the rear portion of the lower surface of the main portion 12 of the cassette case 9 (FIGS. 1, 11 and 12) for positioning the cassette case 9 in the vertical direction.

The directional positioning member 38 is desirably formed as a substantially erect plate-like member. An inner side edge 40 of the directional positioning member 38 has an inclined upper edge 40a which extends upwardly away from the cassette loading position within the tape player 33. The directional positioning member 38 is rotatably supported at its upper end portion by a pin 42 which is suitably fixed to a chassis 41 of the tape player 33. A tension spring 43 is provided between a lower end portion of the directional positioning member 38 and the chassis 41 so as to apply a torque to the member 38 in a direction such that the inner side edge 40 is urged laterally inward toward the cassette loading position.

When the cassette case 9 is generally positioned by means of the cassette holder 35 and finally or accurately positioned by means of the reference pin 37 and the directional positioning member 38, as previously described, the information indicating portion 31 on the lower surface 13a of the additional portion 13 is positioned just above a plurality of detection switches 44, as shown in FIG. 9. When the cassette case 9 is thus accurately positioned, the upper ends of pins 45 of the detection switches 44 register with respective circular portions 32 of the information indicating portion 31. Accordingly, in the case in which a hole 46 is formed through a circular portion 32, the upper end of the respective pin 45 is inserted into the hole 46, so that the pin 45 is therefore not depressed by the lower surface 13a of the additional portion 13. In the case in which a hole 46 is not formed through a circular portion 32, the respective pin 45 facing such imperforate circular portion 32 is depressed by the lower surface 13a of the additional portion 13. Thus, the switches 44 determine whether or not holes 46 are present at the corresponding circular portions 32 and, as a result, information relating to various characteristics of the tape cassette 8 may be read by the tape player 33. In the embodiment described with reference to FIG. 9, the detection switches 44, which function as information reading members, are of a contact type. However, it is not necessary that the information reading members be such contact-type switches. For instance, the information reading members may be of a non-contact type, such as, reflection type photosensors capable of detecting the presence or absence of the holes 46 according to differences in the reflectance of the circular portions 32.

When a VHS tape cassette 1 is loaded into the tape player 33, the loaded or operative position of the VHS tape cassette 1 is generally restricted by the cassette holder 35 so as to exclude the cassette case 2 from the side portion of the cassette holders corresponding to the hole portion 36b. Therefore, the detection switches 44 for the HD tape cassette 8 cannot engage the VHS tape cassette 1 (see FIG. 10) during downward movement of the latter with the holder 35 to its operative position. Accordingly, the detection switches 44 are prevented from hindering the loading of the VHS tape cassette 1. Further, the detection switches 44 are prevented from malfunctioning due to the loading of the VHS tape cassette 1.

Figure 10:
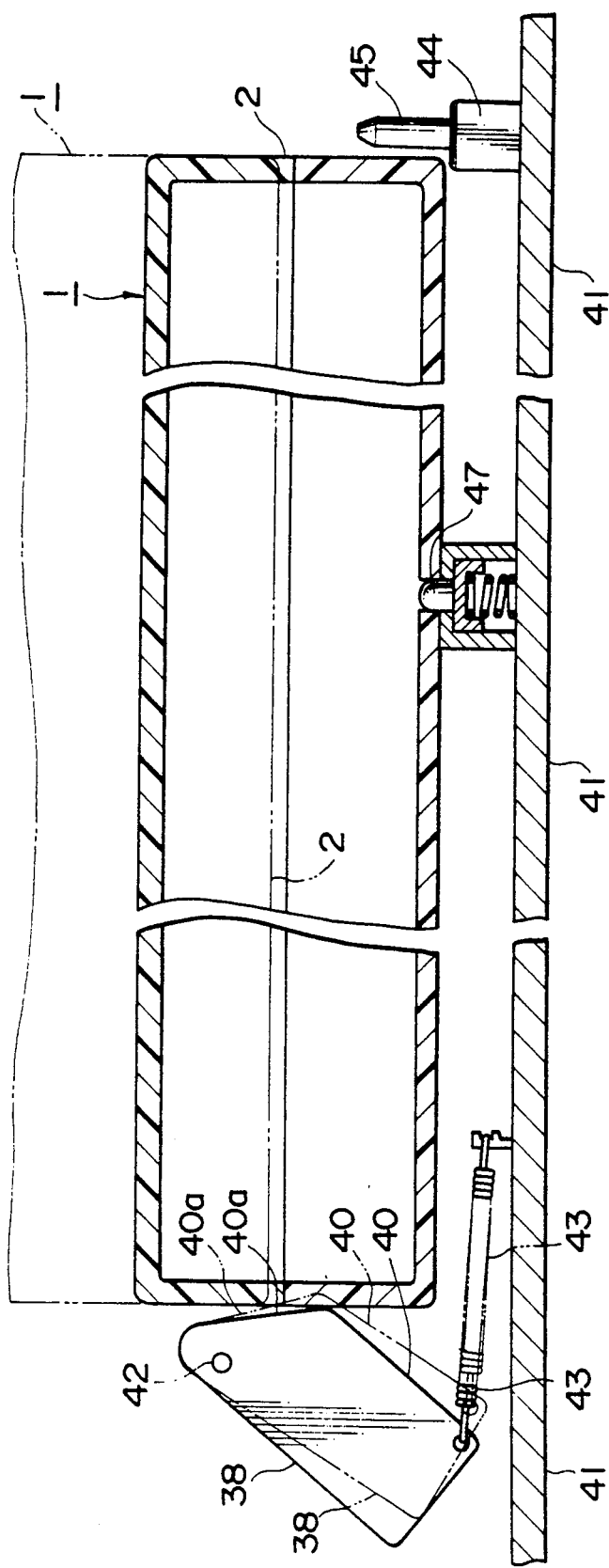
FIG. 10 is a view similar to FIG. 8, with another type of tape cassette loaded in place.

In FIGS. 8 and 10, there is shown a detection switch 47 which functions as an information reading member for detecting the VHS tape cassette 1.

Although the directional positioning member 38 is urged by spring 43 to a position shown in dot-dash lines on FIG. 10, it does not interfere with the loading of the VHS tape cassette 1 for the reason that, during loading of the VHS tape cassette 1 into the tape player 33, and more precisely, during the downward movement of the VHS cassette 1 with the holder 35 to its operative position, one side edge of the lower surface of the cassette case 2 comes into contact from above with the inclined upper edge 40a of the directional positioned member 38 and laterally deflects the member 38 out of the path of the cassette 1, as shown in FIG. 10. In other words, the directional positioning member 38 is turned about the pin 42 and against the tensile force of the tension spring 43 so as to escape to a position which does not hinder the loading of the cassette case 2 of the VHS tape cassette 1, thus avoiding any problems in the loading operation of the VHS tape cassette 1.

In the above-described embodiment, the information indicating portion 31 has been described as being situated on an additional portion 13 of the cassette case 9 which has a slightly smaller thickness than the main portion 12 of the case. However, if only the information indicating function is considered, then the thickness of the additional portion 13 may be equal to that of the main portion 12 of the case 9, as shown in FIG. 15, which illustrates another embodiment of the present invention. It will be appreciated that, in the embodiment of FIG. 15, the overall lower surface of the cassette case 9 is substantially flat, and a plurality of holes (not shown) similar to the holes 46 on FIG. 9 are formed as the information indicating portion at a corner portion of the cassette case where the bottom wall and a side wall of the cassette case intersect each other.

Thus, in accordance with the present invention, a tape cassette comprises a cassette case for accommodating a magnetic recording tape, the cassette case having a main portion with an external size which is substantially the same as that of a cassette case of a different type of tape cassette and an additional case portion which extends from one side of the main portion; and an information indicating portion provided on a lower surface of the additional case portion for indicating, by whether or not a hole is present at a predetermined position therein, information as to predetermined characteristics of the respective tape cassette.

With this arrangement, and particularly when the additional case portion has a thickness smaller than that of the main case portion, and information reading member provided in the tape player 33 for determining whether or not a hole is present at a predetermined position in the information indicating portion 31 can be located at a position so as not to interfere with the loading of a cassette case of another type of tape cassette. Therefore, the information reading member does not hinder the loading of different types of tape cassettes into the tape player 33 and malfunctions of the information reading member due to the loading of the different types of tape cassettes are avoided.

Although the above embodiments of the present invention have been described with reference to the situation in which the tape cassette according to the present invention, for example, an HD tape cassette, and a different type of tape cassette, such as, a VHS tape cassette, can be each employed in a compatible VTR, the present invention can be implemented even in the absence of such a compatible VTR. In this respect, it will be seen that, since the tape cassette according to the present invention has substantially the same external size as a conventional VHS tape cassette, a VTR dedicated to use with the tape cassette according to the present invention may employ a cassette holder, cassette loading mechanism, tape loading mechanism, substantially corresponding to those used in a conventional VTR dedicated for use with the VHS tape cassette. Further, the automatic assembling system or the like for used in the manufacture of the conventional VTR can also be utilized. Accordingly, the cost of parts and assembling can be minimized, and maintenance, such as, repairing or replacement of parts, can be easily accomplished.

Also, in the embodiment of this invention described with reference to FIG. 15, and wherein the thickness of the main case portion is equal to that of the additional case portion and the information indicating holes are formed near the side edge of the bottom wall of the cassette case, the space factor of the main case portion can be improved so as to increase the design freedom.

Further, although embodiments of the present invention have been described with reference to certain shapes and structures, the present invention is not so limited and may be applied to other shapes and structures.

Furthermore, although preferred embodiments of the present invention have been described in detail herein with reference to the accompanying drawings, it is to be understood that the invention is not limited to those precise embodiments, and that various changes and modification can be effected therein by one skilled in the art without departing from the scope or spirit of the invention as defined in the appended claims.

What is claimed is:

1. In a tape cassette having a cassette case composed of a top wall and a bottom wall and peripheral walls joining the top wall and the bottom wall at opposite sides of the cassette case, a take-up reel and a supply reel accommodated in said cassette case, and a magnetic recording tape wrapped around said take-up reel and said supply reel, the improvement comprising: information indicating means for indicating information relating to predetermined characteristics of said tape cassette, said information indicating means being formed along a corner portion of said cassette case adjacent one of said sides of the cassette case and including a plurality of substantially in-line holes wherein the presence or absence of each of said holes indicates one of said predetermined characteristics of said tape cassette, wherein said corner portion includes an elongated recess portion which extends along said one side of the cassette case, and said information indicating means is formed in said elongated recess portion.

2. A tape cassette comprising a magnetic recording tape for recording video signals of a first recording format; a cassette case for accommodating said magnetic recording tape; said cassette case having a main portion with an external size which is substantially the same as that of a cassette case accommodating magnetic recording tape for recording video signals of a second recording format and said cassette case having an additional portion which extends from one side of said main portion and which has a thickness slightly smaller than that of said main portion; and information indicating means provided at a lower surface of said additional portion which includes a plurality of substantially in-line holes for indicating information related to predetermined characteristics of said tape cassette wherein the presence or absence of each of said holes indicates one of said predetermined characteristics of said tape cassette.

3. The tape cassette according to claim 2, wherein said plurality of holes are selectively located at respective predetermined positions for indicating said predetermined characteristics.

4. The tape cassette according to claim 3, wherein at least one of said holes indicates a type of said magnetic recording tape.

5. The tape cassette according to claim 3, wherein at least one of said holes indicates a size of said magnetic recording tape.

6. The tape cassette according to claim 5, wherein said size includes a length of said magnetic recording tape.

7. The tape cassette according to claim 5, wherein said size includes a thickness of said magnetic recording tape.

8. The tape cassette according to claim 3, wherein at least one of said holes indicates a frequency band of one of a signal recorded on, and a signal to be recorded on said magnetic recording tape.

9. The tape cassette according to claim 2 wherein said first recording format is of a HD type.

10. The tape cassette according to claim 2 wherein said second recording format is of a NTSC system.

* * * * *